(12) United States Patent
Jhang et al.

(10) Patent No.: US 10,921,289 B2
(45) Date of Patent: Feb. 16, 2021

(54) METHOD FOR MEASURING ULTRASONIC NONLINEARITY GENERATED BY HIGH VOLTAGE PULSER

(71) Applicant: Industry-University Cooperation Foundation Hanyang University, Seoul (KR)

(72) Inventors: Kyung Young Jhang, Seoul (KR); Jong Beom Kim, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 116 days.

(21) Appl. No.: 16/306,248

(22) PCT Filed: Jun. 3, 2016

(86) PCT No.: PCT/KR2016/005935
§ 371 (c)(1),
(2) Date: Nov. 30, 2018

(87) PCT Pub. No.: WO2017/209329
PCT Pub. Date: Dec. 7, 2017

(65) Prior Publication Data
US 2019/0170696 A1    Jun. 6, 2019

(51) Int. Cl.
*G01N 29/42*      (2006.01)
*G01N 29/44*      (2006.01)
(Continued)

(52) U.S. Cl.
CPC .............. *G01N 29/07* (2013.01); *G01N 29/12* (2013.01); *G01N 29/34* (2013.01); *G01N 29/343* (2013.01);
(Continued)

(58) Field of Classification Search
CPC ........ G01N 29/12; G01N 29/46; G01N 29/42; G01N 29/34; G01N 29/4436; G01N 29/07; G01N 29/343
(Continued)

(56) References Cited

U.S. PATENT DOCUMENTS 3,260,105 A * 7/1966 McNulty ................. G01N 29/38
73/609
3,402,598 A * 9/1968 Colgate ................. G01N 29/221
73/629
(Continued)

FOREIGN PATENT DOCUMENTS

JP    2007-155730 A    6/2007
KR    10-0542651 B1    1/2006
(Continued)

OTHER PUBLICATIONS

International Search Report for PCT/KR2016/005935, dated Mar. 2, 2017.

*Primary Examiner* — Jacques M Saint Surin
(74) *Attorney, Agent, or Firm* — Sughrue Mion, PLLC

(57) ABSTRACT

The present invention relates to an ultrasonic nonlinearity measuring method generated by a high voltage pulser and more specifically, includes a calibration step of transmitting and receiving an ultrasonic signal to and from an object to be inspected having a reception probe attached thereto, by a receiving unit; a harmonic wave measuring step of transmitting a tone burst signal to an object to be inspected having a transmission/reception probe attached thereto and receiving the tone burst signal which passes through the object to be inspected, by the receiving unit; a harmonic wave measuring step of transmitting a tone burst signal to an object to be inspected having a transmission probe attached thereto and receiving the transmitted tone burst signal, by a transmitting unit; a calibration step of transmitting and
(Continued)

receiving an ultrasonic signal to and from an object to be inspected having a transmission probe attached thereto, by the transmitting unit; and a step of measuring an ultrasonic nonlinearity of the object to be inspected by comparing a fundamental frequency and a harmonic component measured by the receiving unit and a fundamental frequency and a harmonic component measured by the transmitting unit.

12 Claims, 6 Drawing Sheets

(51) Int. Cl.
*G01N 29/34* (2006.01)
*G01N 29/12* (2006.01)
*G01N 29/46* (2006.01)
*G01N 29/07* (2006.01)

(52) U.S. Cl.
CPC ......... *G01N 29/42* (2013.01); *G01N 29/4436* (2013.01); *G01N 29/46* (2013.01)

(58) Field of Classification Search
USPC ............................................................ 73/597
See application file for complete search history.

(56) References Cited

U.S. PATENT DOCUMENTS

| | | | | |
|---|---|---|---|---|
| 3,533,280 A | * | 10/1970 | McGaughey | G01N 29/0645 73/614 |
| 9,880,133 B1 | * | 1/2018 | Stephanou | G01N 29/04 |
| 2015/0323505 A1 | * | 11/2015 | Seo | G01N 29/2418 73/643 |
| 2016/0120515 A1 | * | 5/2016 | Arai | G01S 15/8925 600/443 |

FOREIGN PATENT DOCUMENTS

| | | |
|---|---|---|
| KR | 10-1477607 B1 | 12/2014 |
| WO | 2014/104563 A1 | 7/2014 |
| WO | 2014/178518 A1 | 11/2014 |

* cited by examiner

[FIG. 1]
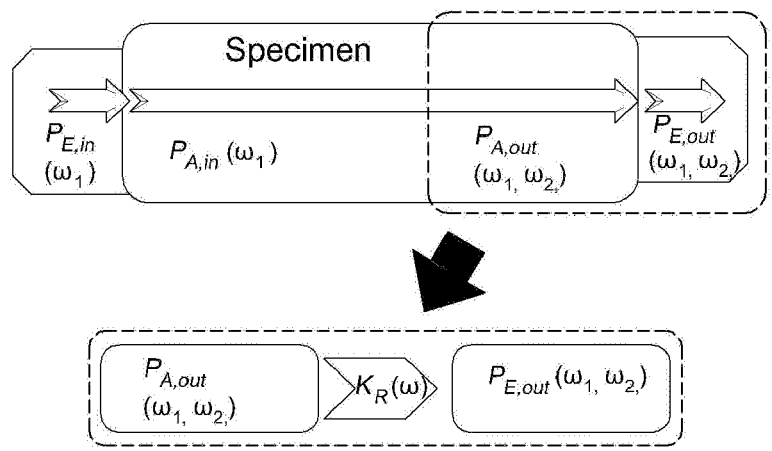
[FIG. 2]
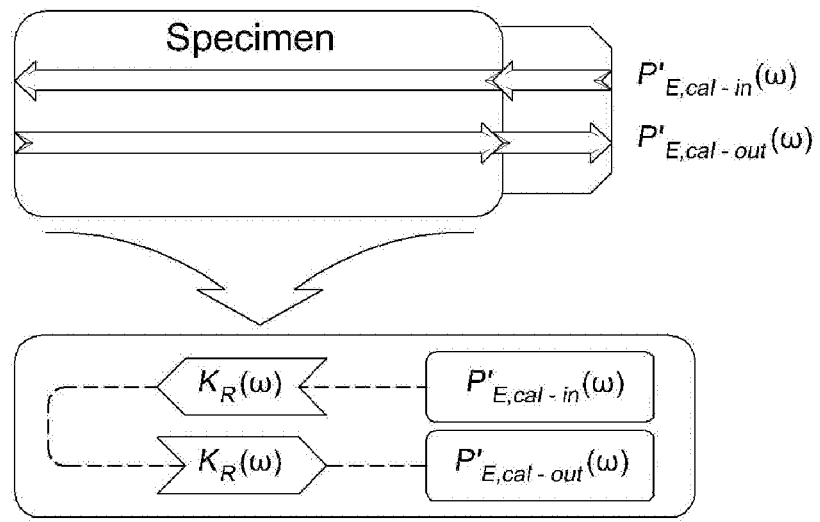

[FIG. 3a]
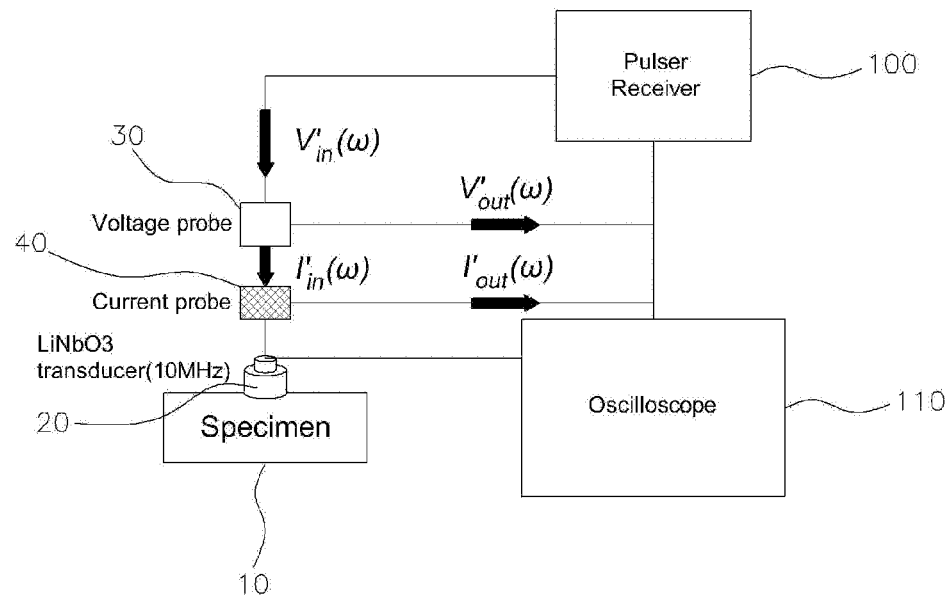
[FIG. 3b]
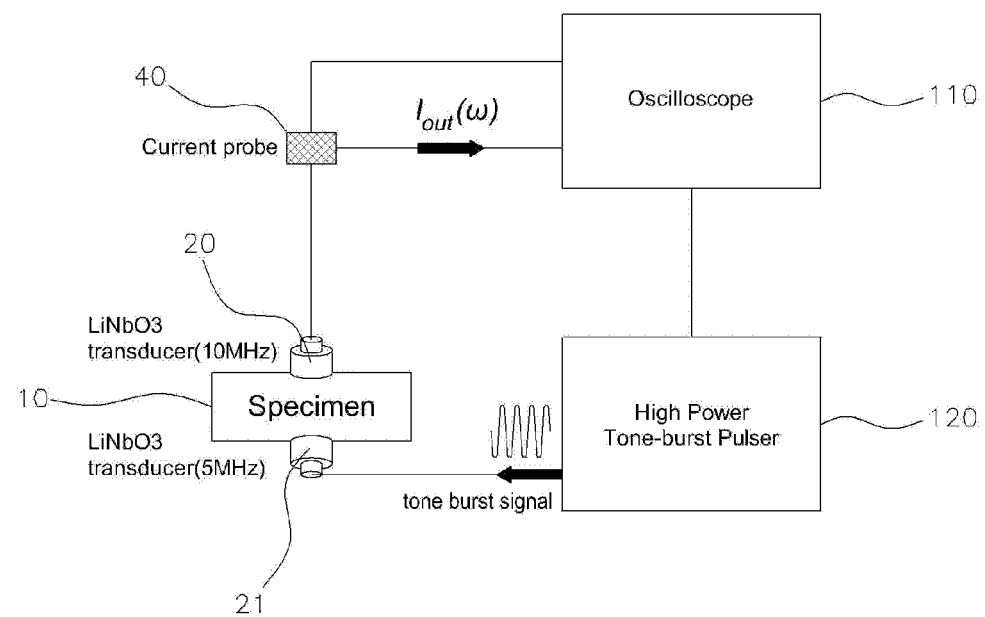

[FIG. 4]
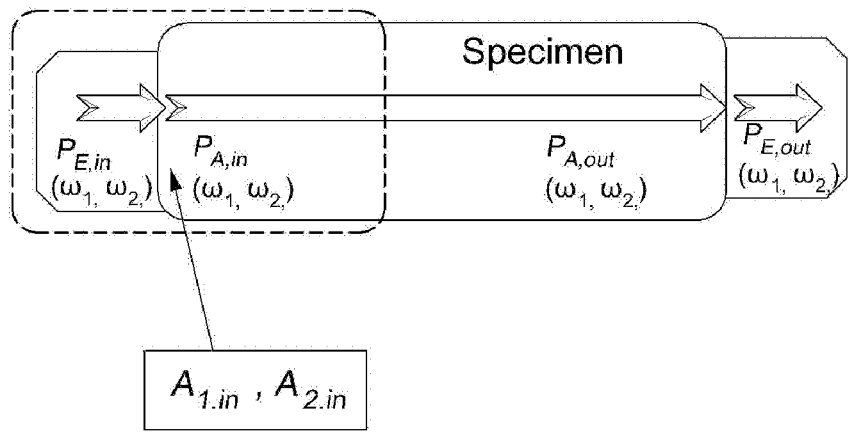
[FIG. 5]
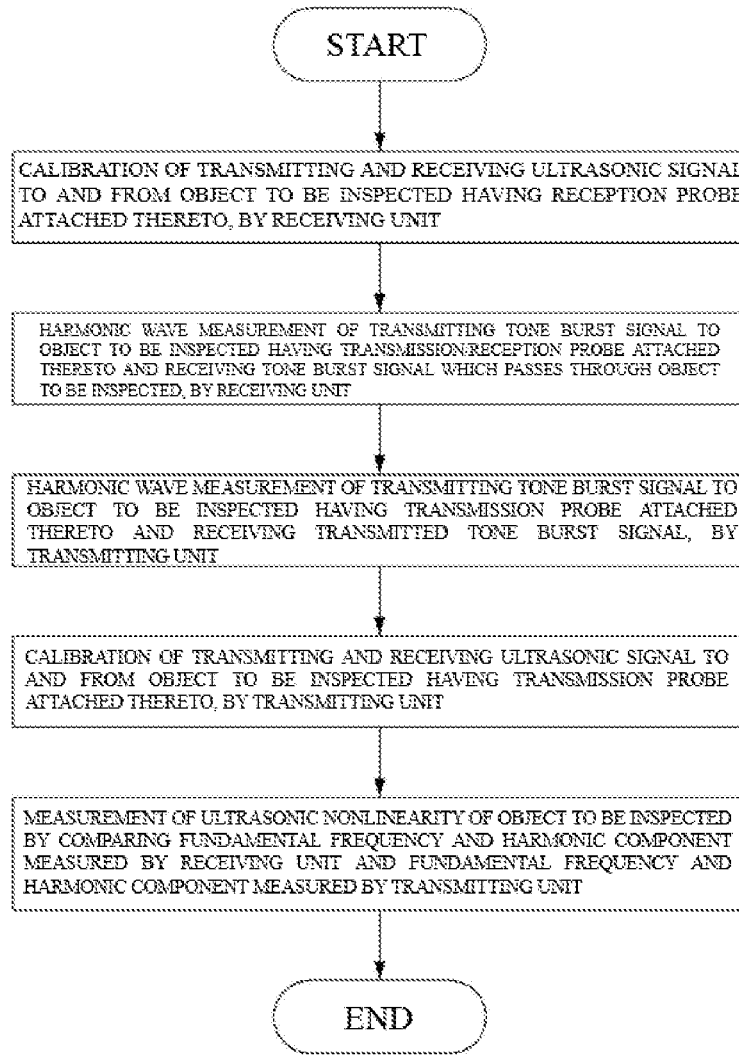

[FIG. 6]
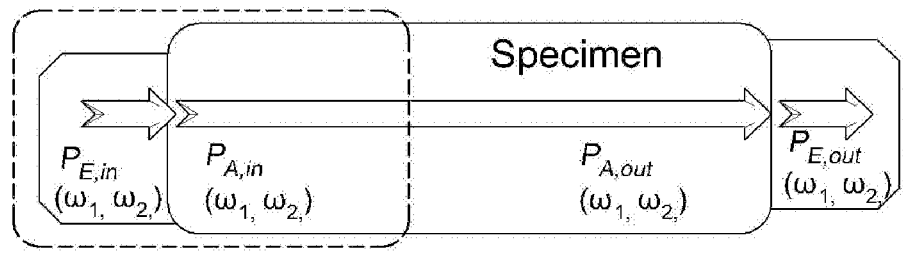
[FIG. 7]
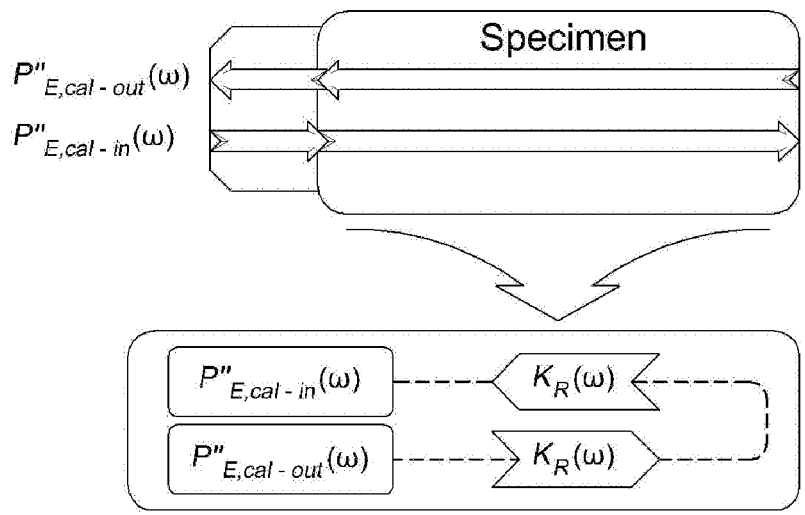

[FIG. 8]
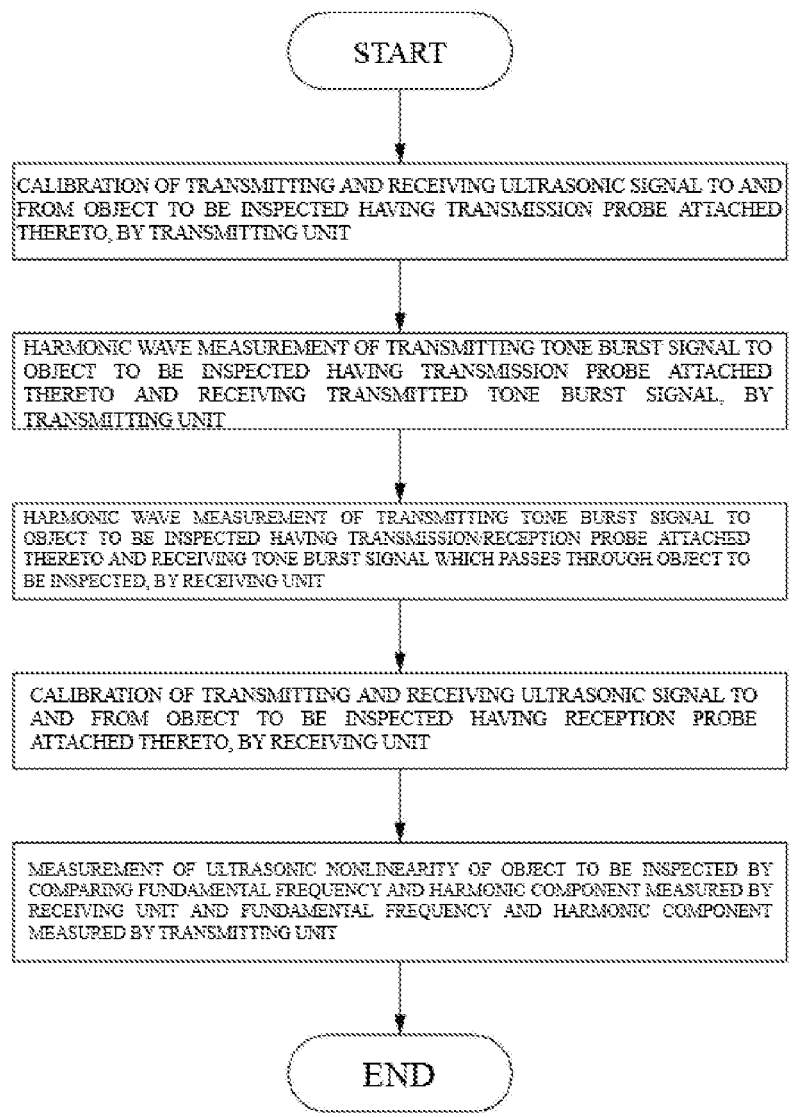

[FIG. 9a]
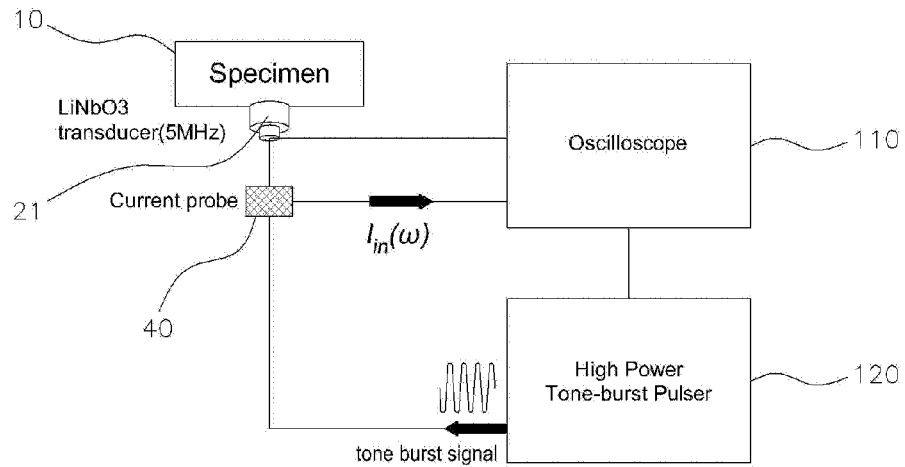
[FIG. 9b]
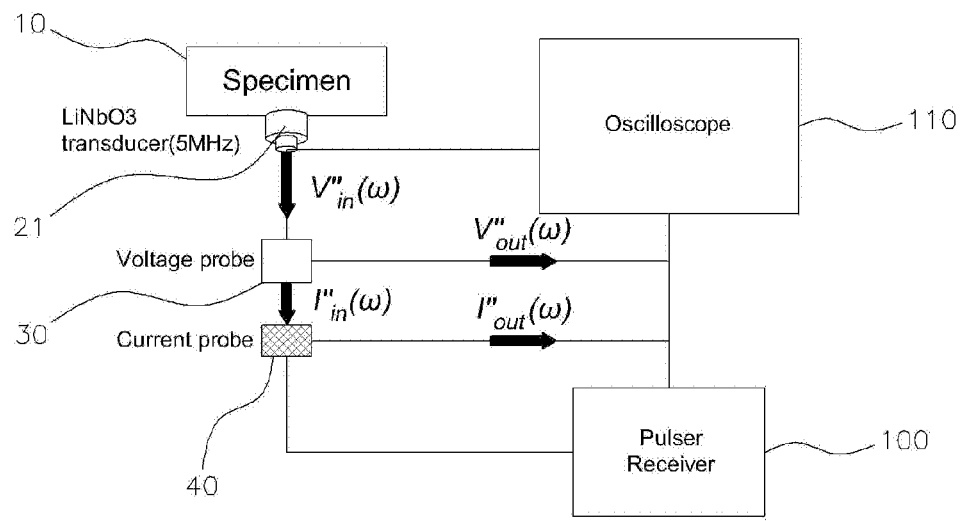

METHOD FOR MEASURING ULTRASONIC NONLINEARITY GENERATED BY HIGH VOLTAGE PULSER

TECHNICAL FIELD

The present invention relates to a method for measuring an ultrasonic nonlinearity generated by a high voltage pulser and more particularly, to a technique for precisely evaluating properties of materials, such as a strength property and a deterioration degree of materials using an ultrasonic wave.

BACKGROUND ART

A nonlinear elastic property of a solid material is a property physically generated by a nonlinear behavior of a working stress for a molecular distance between atoms in the material and an actual interatomic energy of the solid material does exhibit a non-harmonic property rather than a harmonic property.

When a sinusoidal wave with a predetermined frequency propagates in a solid medium having a sufficient amplitude and a non-harmonic property, an ultrasonic wave having a fundamental incident frequency may be distorted due to a difference in a local phase velocity in accordance with a nonlinear elastic property of the material and thus a high order harmonic component corresponding to an integer multiple is generated in the fundamental frequency.

When a difference in a magnitude of a harmonic component or a magnitude of an absolute nonlinear parameter is identified before and after the material is damaged, a damage of the material may be evaluated.

Such an absolute nonlinear parameter $\beta$ may be quantified as represented in the following Equation 1.

$$\beta = \frac{8A_2}{A_1^2 k^2 x} \quad \text{[Equation 1]}$$

Here, $A_1$ is a displacement amplitude of a fundamental component, $A_2$ is a displacement amplitude of a second order harmonic component, k is a wave number, and x is a propagation distance.

A fine damage diagnostic technology of materials through measurement of an ultrasonic nonlinear parameter has been developed by many researchers. The studies have shown that a creep of materials, dislocations caused by the fatigue, and precipitates generated by high temperature usage environments are closely related to the nonlinear parameters.

In the related art, as a method which is widely used to measure an absolute nonlinear parameter, there is a piezoelectric receiving method which measures a displacement of an ultrasonic wave which passes through an object to be inspected to be received. According to this method, a process of converting a displacement amplitude corresponding to a mechanical energy passing through the object to be inspected into an electric signal corresponding to an electric energy is modeled to measure the electric signal and indirectly measure the displacement amplitude of the ultrasonic wave.

Generally, the piezoelectric receiving technique is carried out by two steps of experiments including a harmonic wave measurement experiment which measures a harmonic wave generated in the object to be inspected by attaching a transmission/reception probe to both sides of the object to be inspected and entering a tone burse ultrasonic signal into the object to be inspected and a calibration experiment which is carried out by attaching only a reception probe to calculate a transfer function which corrects the nonlinearity generated by a couplant at an interface between the object to be inspected and the probe and converts the electric signal into a mechanical signal.

As represented in the following Equation 2, $I_{out}(\omega)$ is calculated by the harmonic wave measurement experiment and $H_{out}(\omega_1,\omega_2)$ is calculated by the calibration experiment to calculate a displacement amplitude $A(\omega_1,\omega_2)$ of a fundamental frequency and a displacement amplitude $A(\omega_1,\omega_2)$ of a second order harmonic wave.

$$|A(\omega_1,\omega_2)|=|H_{out}(\omega_1,\omega_2)||I_{out}(\omega_1,\omega_2)| \quad \text{[Equation 2]}$$

Inverse Fourier transform is carried out from the measured displacement amplitude $A(\omega_1,\omega_2)$ to calculate $A_1$ which is a displacement of the fundamental frequency and $A_2$ which is a displacement amplitude of the second order harmonic wave.

FIG. 1 is a view illustrating for explaining a harmonic wave measuring method.

Referring to FIG. 1, an electric energy $P_{E,in}(\omega_1)$ having a single frequency which is incident into a probe is converted into an acoustic energy $P_{A,in}(\omega_1)$ having a single frequency and the acoustic energy propagates the material to generate a harmonic component.

The acoustic energy $P_{A,out}(\omega_1,\omega_2)$ having the harmonic component and the fundamental frequency component generated as described above is incident into a receiving probe to be converted into the electric energy $P_{E,out}(\omega_1,\omega_2)$. A relationship between the acoustic energy and the electric energy of the receiving unit during this process is represented by a conversion efficiency $K_R(\omega)$ and a relationship of $P_{A,out}(\omega_1,\omega_2)$ and $P_{E,out}(\omega_1,\omega_2)$ is established as represented by Equation 3.

$$P_{A,out}(\omega_1,\omega_2) = \frac{P_{E,out}(\omega_1,\omega_2)}{K_R(\omega)} \quad \text{[Equation 3]}$$

Equation 3 may be summarized by the relationship of the displacement amplitude $A_{out}(\omega_1,\omega_2)$ and the current $I_{out}(\omega_1,\omega_2)$ of the ultrasonic wave which passes through the material as represented by the following Equations 4 and 5 and a conversion coefficient $H_{out}(\omega_1,\omega_2)$ of Equation 6 is calculated to obtain the displacement amplitude of the ultrasonic wave which is received by passing through the object to be inspected, from the measured electric signal.

$$\left|\frac{1}{2}\omega A_{out}(\omega_1,\omega_2)\right|^2 \rho v a = \frac{\frac{1}{2}|I_{out}(\omega_1,\omega_2)|^2 \text{Re}(Z_s)}{K_R(\omega)} \quad \text{[Equation 4]}$$

Here, $\omega$ is a frequency, $\omega_1$ is a fundamental frequency, $\omega_2$ is a second order harmonic wave, $I_{out}$ is a tone burst current signal which is generated from the high voltage pulser during the harmonic wave measurement and passes through a material to be received, $\rho$ is a density, v is an ultrasonic wave velocity, a is an area of a probe, and $Z_s$ is an impedance of the pulser.

$$|A_{out}(\omega_1,\omega_2)| = |H_{out}(\omega_1,\omega_2)||I_{out}(\omega_1,\omega_2)| \quad \text{[Equation 5]}$$

$$|H_{out}(\omega)| = \sqrt{\frac{\text{Re}(Z_s)}{\omega^2 \rho v a\, K_R(\omega)}} \qquad \text{[Equation 6]}$$

Here, ω is a frequency, $\omega_1$ is a fundamental frequency, $\omega_2$ is a second order harmonic wave, $I_{out}$ is a tone burst current signal which is generated from the high voltage pulser during the harmonic wave measurement and passes through a material to be received, ρ is a density, v is an ultrasonic wave velocity, a is an area of a probe, and $Z_s$ is an impedance of the pulser.

FIG. 2 is a view illustrating for explaining a calibration measuring method.

Referring to FIG. 2, when a single probe is attached to a specimen and an electric energy $P'_{E,cal\text{-}in}(\omega)$ is incident thereto to generate a broadband ultrasonic wave, the generated ultrasonic wave is reflected from a bottom of the material and converted into the electric energy $P'_{E,cal\text{-}out}(\omega)$ again by the probe to be received. A relationship of $P'_{E,cal\text{-}in}(\omega)$ and $P'_{E,cal\text{-}out}(\omega)$ of FIG. 2 is established as represented in Equation 7.

$$P'_{E,cal\text{-}in}(\omega) = K_R(\omega)^2 P'_{E,cal\text{-}out}(\omega) \qquad \text{[Equation 7]}$$

Here, the transfer function $K_R(\omega)$ is represented by the following Equation 8 by two-port transducer modeling. When the above Equation 7 is summarized using the transfer function $K_R(\omega)$, a conversion coefficient $H_{out}(\omega)$ may be calculated from transmitted/received voltage and current as represented by Equation 9 and the conversion coefficient corrects the nonlinearity due to the couplant in accordance with the reception probe attachment and converts the measured electric signal into a displacement amplitude of the ultrasonic wave.

$$K_R(\omega) = 2\left(\frac{|I_{out}(\omega)|\text{Re}(Z_L)}{|V_s(\omega)|}\right) = 2\left(\frac{|I'_{out}(\omega)|\text{Re}(Z_s)}{\left|I'_{in}(\omega)\left(\frac{V'_{out}(\omega)}{I'_{out}(\omega)}\right) + V'_{in}(\omega)\right|}\right) \qquad \text{[Equation 8]}$$

Here, ω is a frequency, $I_{out}$ is a tone burst current signal which is generated from the high voltage pulser during the harmonic wave measurement and passes through the material to be received, $Z_L$ and $Z_s$ are impedances of the pulser and have the same value, $I_{in}'(\omega)$ is a current signal which is incident into the material from the broadband pulser, $V_{in}'(\omega)$ is a voltage signal which is incident into the material from the broadband pulser, $I_{out}'(\omega)$ is a current signal received after the ultrasonic wave incident into the material is reflected from the bottom of the material, $V_{out}'(\omega)$ is a voltage signal received after the ultrasonic wave incident into the material is reflected from the bottom of the material.

$$|H_{out}(\omega)| = \sqrt{\frac{\left|I'_{in}(\omega)\left(\frac{V'_{out}(\omega)}{I'_{out}(\omega)}\right) + V'_{in}(\omega)\right|}{2\omega^2 \rho v a |I'_{out}(\omega)|}} \qquad \text{[Equation 9]}$$

In the above Equation, prime (') means a signal obtained from the calibration and description on the variable is the same as described above.

FIGS. 3A and 3B are views illustrating for explaining an absolute nonlinear parameter measuring method. Specifically, FIG. 3A is a view for explaining a calibration measuring method of a receiving unit, FIG. 3B is a view for explaining a harmonic wave measuring method of a receiving unit, and an absolute nonlinear parameter is measured through a process of two steps of FIGS. 3A and 3B.

Referring to FIG. 3A, a reception probe 20 of 10 MHz is attached to an object 10 to be inspected and signals $V_{in}'$, $V_{out}'$, $I_{in}'$, $I_{out}'$ out are measured using a voltage probe 30, a current probe 40, and an oscilloscope 110 to calculate $H_{out}(\omega)$.

Next, referring to FIG. 3B, a transmission probe 21 of 5 MHz is attached to the object 10 to be inspected and a tone burst signal is generated using a high voltage pulser 120. Further, the receiving unit receives the tone burst signal $I_{out}(\omega)$.

In this case, an ultrasonic signal may be transmitted/received using a broadband ultrasonic pulser receiver 100.

A displacement amplitude $A_1$ of a fundamental frequency and a displacement amplitude $A_2$ of a second order harmonic wave are calculated by the current and the voltage measured as described above and the absolute nonlinear parameter $\beta_{out}$ may be measured as represented in Equation 10.

$$\beta_{out} = \frac{8 A_2}{A_1^2 k^2 x} \qquad \text{[Equation 10]}$$

As described above, an absolute nonlinear parameter measuring method using a piezoelectric reception technique of the related art is a method for measuring a nonlinear parameter of a receiving unit by measuring a current $I_{out}(\omega)$ by an ultrasonic receiving unit and converting the current into a displacement amplitude using a conversion coefficient $H_{out}(\omega)$ obtained by the calibration technique.

However, such a measuring method is based on the assumption that the ultrasonic wave which is incident into the material from the high voltage pulse has only the fundamental frequency component.

FIG. 4 is a view illustrating a nonlinearity which is incident into a material from a transmitting unit.

However, as illustrated in FIG. 4, the ultrasonic wave which is actually incident into an object to be inspected includes a harmonic component as well as the fundamental frequency component. Therefore, the received ultrasonic wave may include the harmonic component generated when the ultrasonic wave is transmitted from the high voltage pulser, as well as the harmonic component generated due to the material.

Generally, many researchers use a method of removing the harmonic component transmitted from the high voltage pulser by mounting a filter in an ultrasonic transmitting unit to remove the nonlinearity of the transmission signal, but there is a problem in that the harmonic component of the transmitted signal is not completely removed until now.

DISCLOSURE

Technical Problem

In the field of measurement of deterioration of a material of the related art, the harmonic component of the transmitted signal is not completely removed and the nonlinear parameter measured as described above includes the nonlinearity generated by the high voltage pulser as well as the nonlinearity of the material, so that it is hard to say that it is a nonlinear parameter of a pure material.

However, an object to be achieved by the present invention is to provide a method for measuring a nonlinearity of a transmitted signal by considering a fundamental wave component and a harmonic component incident into a material from a high voltage pulser.

Technical Solution

According to an exemplary embodiment of the present invention, a method for measuring an ultrasonic nonlinearity generated by a high voltage pulser includes: a calibration step of transmitting and receiving an ultrasonic signal to and from an object to be inspected having a reception probe attached thereto, by a receiving unit, a harmonic wave measuring step of transmitting a tone burst signal generated using a high voltage pulser to an object to be inspected having a transmission/reception probe attached thereto and receiving the tone burst signal which passes through the object to be inspected, by the receiving unit, a harmonic wave measuring step of transmitting a tone burst signal to an object to be inspected having a transmission probe attached thereto and receiving the transmitted tone burst signal, by a transmitting unit, a calibration step of transmitting and receiving an ultrasonic signal to and from the object to be inspected having a transmission probe attached thereto, by a transmitting unit, and a step of measuring an ultrasonic nonlinearity of the object to be inspected by comparing a fundamental frequency and a harmonic component measured by the receiving unit and a fundamental frequency and a harmonic component measured by the transmitting unit.

Further, the ultrasonic signal may be transmitted and received using a broadband ultrasonic pulser receiver.

Further, the harmonic wave measuring step by a receiving unit includes a step of additionally attaching a transmission probe to the object to be inspected having the reception probe attached thereto.

Further, the harmonic wave measuring step by a transmitting unit includes a step of removing a reception probe from the object to be inspected having the transmission/reception probe attached thereto.

Further, during the calibration step by a receiving unit, a conversion coefficient represented by the following Equation 11 is measured from a voltage and a current transmitted/received by the ultrasonic signal of the receiving unit.

$$|H_{out}(\omega)| = \sqrt{\frac{\left|I'_{in}(\omega)\left(\frac{V'_{out}(\omega)}{I'_{out}(\omega)}\right) + V'_{in}(\omega)\right|}{2\omega^2 \rho v a |I'_{out}(\omega)|}}$$  [Equation 11]

Further, during the calibration step by a transmitting unit, a conversion coefficient represented by the following Equation 15 is measured from a voltage and a current transmitted/received by the ultrasonic signal of the transmitting unit.

$$|H_{in}(\omega)| = \sqrt{\frac{K_R(\omega)\,\text{Re}(Z_s)}{\omega^2 \rho v a}}$$  [Equation 15]

Further, the fundamental frequency and the harmonic component measured by the receiving unit are calculated from the following Equation 16.

$$|A_{out}(\omega_1,\omega_2)| = |H_{out}(\omega_1,\omega_2)||I_{out}(\omega_1,\omega_2)|$$  [Equation 16]

Further, the fundamental frequency and the harmonic component measured by the transmitting unit are calculated from the following Equation 17.

$$|A_{in}(\omega_1,\omega_2)| = |H_{in}(\omega_1,\omega_2)||I_{in}(\omega_1,\omega_2)|$$  [Equation 17]

Further, during the ultrasonic nonlinearity measuring step of an object to be inspected, the fundamental frequency component of the object to be inspected is measured through a difference between the fundamental frequency component measured by the receiving unit and the fundamental frequency component measured by the transmitting unit and the harmonic component of the object to be inspected is measured through a difference between the harmonic component measured by the receiving unit and the harmonic component measured by the transmitting unit.

Further, the fundamental frequency component and the harmonic component of the object to be inspected are displacement amplitudes of a fundamental frequency component and a second order harmonic component, respectively and an absolute nonlinear parameter of the object to be inspected is represented by the following Equation 18.

$$\beta = \frac{8A_2}{A_1^2 k^2 x}$$  [Equation 18]

According to another exemplary embodiment of the present invention, an ultrasonic nonlinearity measuring method includes: a calibration step of transmitting and receiving an ultrasonic signal to and from an object to be inspected having a transmission probe attached thereto, by a transmitting unit, a harmonic wave measuring step of transmitting a tone burst signal to an object to be inspected having a transmission probe attached thereto and receiving the transmitted tone burst signal, by a transmitting unit, a harmonic wave measuring step of transmitting a tone burst signal to an object to be inspected having a transmission/reception probe attached thereto and receiving the tone burst signal which passes through the object to be inspected, by a receiving unit, a calibration step of transmitting and receiving an ultrasonic signal to and from an object to be inspected having a reception probe attached thereto, by a receiving unit, and a step of measuring an ultrasonic nonlinearity of the object to be inspected by comparing a fundamental frequency and a harmonic component measured by the receiving unit and a fundamental frequency and a harmonic component measured by the transmitting unit.

Further, the harmonic wave measuring step by a receiving unit includes a step of additionally attaching a reception probe to the object to be inspected having the transmission probe attached thereto.

Further, the calibration step by a receiving unit includes a step of removing a transmission probe from the object to be inspected having the transmission/reception probe attached thereto.

Advantageous Effects

According to the present invention, a nonlinearity generated from the high voltage pulser included in an absolute nonlinear parameter measured according to the related art can be measured and as a result, a pure nonlinear parameter value of a material may be quantitatively measured.

As a result, a strength change and a deterioration of a material for quality control and a safety management of an industrial structural material are precisely diagnosed in the field so that a potential damage risk of the industrial structure and advanced part materials is preliminarily diagnosed to realize effective integrity maintenance of the structure and the material.

DESCRIPTION OF DRAWINGS

FIG. 1 is a view illustrating for explaining a harmonic wave measuring method.

FIG. 2 is a view illustrating for explaining a calibration measuring method.

FIG. 3A is a view for explaining a calibration measuring method of a receiving unit.

FIG. 3B is a view for explaining a harmonic wave measuring method of a receiving unit.

FIG. 4 is a view illustrating a nonlinearity which is incident into a material from a transmitting unit.

FIG. 5 is a flowchart illustrating for explaining an ultrasonic nonlinearity measuring method according to an exemplary embodiment of the present invention in detail.

FIG. 6 is a view illustrating for explaining a harmonic wave measuring step of a transmitting unit according to an exemplary embodiment of the present invention.

FIG. 7 is a view illustrating for explaining a calibration method of a transmitting unit according to an exemplary embodiment of the present invention.

FIG. 8 is a flowchart illustrating for explaining an ultrasonic nonlinearity measuring method according to another exemplary embodiment of the present invention in detail.

FIG. 9A is a view for explaining a harmonic wave measuring method of a transmitting unit according to an exemplary embodiment of the present invention.

FIG. 9B is a view for explaining a calibration measuring method of a transmitting unit according to an exemplary embodiment of the present invention.

DESCRIPTION OF MAIN REFERENCE NUMERALS OF DRAWINGS

10: Object to be inspected
20: Reception probe
21: Transmission probe
30: Voltage probe
40: Current probe
100: Pulser receiver
110: Oscilloscope
120: High voltage pulser

BEST MODE

Advantages and characteristics of the present invention, and a method of achieving the advantages and characteristics will be clear by referring to exemplary embodiments described below in detail together with the accompanying drawings.

However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the invention, and the present invention will be defined by the appended claims Like reference numerals indicate like elements throughout the specification.

Hereinafter, exemplary embodiments of the present invention will be described in detail with reference to the accompanying drawings.

In order to quantitatively evaluate the deterioration of the material in the related art, the nonlinear parameter is quantitatively measured by an absolute nonlinear parameter measuring method. However, according to this measuring method, a receiving unit converts an electric signal into a displacement amplitude to measure a nonlinear parameter of the receiving unit.

However, the nonlinear parameter measured by the receiving unit according to the above-described method includes a nonlinearity generated by a high voltage pulser in addition to the nonlinearity of the material.

In order to supplement the problem of the related art, the present invention suggests a method of measuring a nonlinearity $\beta_{in}$ of a transmitted signal by measuring a fundamental frequency component $A_{1,in}$ and a harmonic component $A_{2,in}$ incident into the material from the high voltage pulser.

To this end, hereinafter, a new vertical modeling to measure a displacement amplitude of an ultrasonic wave with an electric signal in a transmitting unit using the harmonic wave measurement and the calibration method in a transmitted signal is suggested.

FIG. 5 is a flowchart illustrating for explaining an ultrasonic nonlinearity measuring method according to an exemplary embodiment of the present invention in detail.

Referring to FIG. 5, a calibration step of a receiving unit corresponds to a step of transmitting and receiving an ultrasonic signal to and from an object to be inspected having a reception probe attached thereto and the ultrasonic signal may be transmitted and received using a broadband ultrasonic pulser receiver.

During the calibration step of a receiving unit, a conversion coefficient represented by the following Equation 11 is measured from a voltage and a current transmitted/received by the ultrasonic signal of the receiving unit.

$$|H_{out}(\omega)| = \sqrt{\frac{\left| I'_{in}(\omega)\left(\frac{V'_{out}(\omega)}{I'_{out}(\omega)}\right) + V'_{in}(\omega) \right|}{2\omega^2 \rho v a |I'_{out}(\omega)|}} \qquad [\text{Equation 11}]$$

Here, $\omega$ is a frequency, $\rho$ is a density, $v$ is an ultrasonic wave velocity, $a$ is an area of a probe, $I_{in}'(\omega)$ is a current signal which is incident into the material from the broadband pulser, $V_{in}'(\omega)$ is a voltage signal which is incident into the material from the broadband pulser, $I_{out}'(\omega)$ is a current signal received after the ultrasonic wave incident into the material is reflected from the bottom of the material, $V_{out}'(\omega)$ is a voltage signal received after the ultrasonic wave incident into the material is reflected from the bottom of the material.

A harmonic wave measuring step of a receiving unit which is a subsequent step corresponds to a step of transmitting a tone burst signal to an object to be inspected having a transmission/reception probe attached thereto and receiving the tone burst signal which passes through the object to be inspected. The transmission/reception probe may include a transmission probe and a reception probe. Here, the tone burst signal may be generated using the high voltage pulser.

Further, the harmonic wave measuring step of a receiving unit includes a step of additionally attaching a transmission probe to the object to be inspected having the reception probe attached thereto and the reception probe may be attached to one side of the object to be inspected and the transmission probe may be attached to the other side of the object to be inspected.

A harmonic wave measuring step of a transmitting unit which is a subsequent step corresponds to a step of transmitting the tone burst signal to the object to be inspected having the transmission probe attached thereto and receiving the transmitted tone burst signal.

Here, the harmonic wave measuring step of a transmitting unit may include a step of removing the reception probe from the object to be inspected having the transmission/reception probe attached thereto.

FIG. 6 is a view illustrating for explaining a harmonic wave measuring step of a transmitting unit according to an exemplary embodiment of the present invention.

Even though in the absolute nonlinearity measuring method of the related art, it is assumed that there is no nonlinearity of the ultrasonic wave in the electric energy incident into the transmission probe, referring to FIG. 6, an electric energy $P_{E,in}(\omega_1,\omega_2)$ which is generally transmitted has a nonlinearity.

Therefore, an acoustic energy $P_{A,in}(\omega_1,\omega_2)$ which is incident into a material also includes a nonlinearity.

A relationship of the electric energy and the acoustic energy is summarized using a conversion efficiency $K_R(\omega)$ as represented in the following Equation 12.

$$P_{A,in}(\omega_1,\omega_2)=P_{E,in}(\omega_1,\omega_2)K_R(\omega) \quad \text{[Equation 12]}$$

Equation 12 may be summarized by a relationship of a displacement amplitude $A(\omega_1,\omega_2)$ of an ultrasonic wave which passes through a material and a current $I_{in}(\omega)$ as represented in the following Equation 13.

$$\left|\frac{1}{2}\omega A_{in}(\omega_1,\omega_2)\right|^2 \rho v a = \frac{1}{2}|I_{in}(\omega_1,\omega_2)|^2 \text{Re}(Z_s)K_R(\omega) \quad \text{[Equation 13]}$$

Here, $\omega$ is a frequency, $\omega_1$ is a fundamental frequency, $\omega_2$ is a second order harmonic wave, $\rho$ is a density, $v$ is an ultrasonic wave velocity, $a$ is an area of a probe, $I_{in}$ is a tone burst current signal which is generated from the high voltage pulser during the harmonic wave measurement to be incident into a material, and $Z_s$ is an impedance of the pulser.

A calibration step of a transmitting unit which is a subsequent step corresponds to a step of transmitting and receiving an ultrasonic signal to and from an object to be inspected having a transmission probe attached thereto.

FIG. 7 is a view illustrating for explaining a calibration method of a transmitting unit according to an exemplary embodiment of the present invention.

When a single probe is attached to a specimen and an electric energy $P_{E,cal-in}(\omega)$ is incident thereto to generate a broadband ultrasonic wave, the generated ultrasonic wave is reflected from a bottom of the material and converted into the electric energy $P_{E,cal-out}(\omega)$ again by the probe to be received.

A relationship of $P_{E,cal-in}(\omega)$ and $P_{E,cal-out}(\omega)$ of FIG. 7 is established as represented in the following Equation 14.

$$P_{E,cal-in}(\omega)=K_R(\omega)^2 P_{E,cal-out}(\omega) \quad \text{[Equation 14]}$$

When the relationship is summarized using two-port transducer modeling, the conversion coefficient $H_{in}(\omega)$ may be calculated from a voltage and a current which are transmitted and received as represented in the following Equation 15 and the conversion coefficient $H_{in}(\omega)$ is different from $H_{out}(\omega)$ calculated through calibration by the receiving unit.

During the calibration step of a transmitting unit, a conversion coefficient represented by the following Equation 15 is measured from a voltage and a current transmitted and received by the ultrasonic signal of the transmitting unit.

$$|H_{in}(\omega)| = \sqrt{\frac{K_R(\omega)\,\text{Re}(Z_s)}{\omega^2 \rho v a}} \quad \text{[Equation 15]}$$

Here, $\omega$ is a frequency, $\rho$ is a density, $v$ is an ultrasonic wave velocity, $a$ is an area of a probe, and $Z_s$ is an impedance of a pulser.

The conversion coefficient corrects the nonlinearity due to the couplant in accordance with the reception probe attachment and converts the measured electric signal into the displacement amplitude of the ultrasonic wave.

An ultrasonic nonlinearity measuring step of an object to be inspected which is a subsequent step corresponds to a step of comparing a fundamental frequency and a harmonic component measured by the receiving unit and a fundamental frequency and a harmonic component measured by the transmitting unit.

The fundamental frequency and the harmonic component measured by the receiving unit are calculated from the following Equation 16 and Equation 16 is calculated from the above Equation 13.

$$|A_{out}(\omega_1,\omega_2)|=|H_{out}(\omega_1,\omega_2)||I_{out}(\omega_1,\omega_2)| \quad \text{[Equation 16]}$$

Here, $\omega_1$ is a fundamental frequency, $\omega_2$ is a second order harmonic wave, $I_{out}$ is a tone burst current signal which is generated from the high voltage pulser during the harmonic wave measurement and passes through the material to be received.

The fundamental frequency and the harmonic component measured by the transmitting unit are calculated from the following Equation 17.

$$|A_{in}(\omega_1,\omega_2)|=|H_{in}(\omega_1,\omega_2)||I_{in}(\omega_1,\omega_2)| \quad \text{[Equation 17]}$$

Here, $\omega_1$ is a fundamental frequency, $\omega_2$ is a second order harmonic wave, $I_{in}$ is a tone burst current signal which is generated from the high voltage pulser during the harmonic wave measurement to be incident into the material.

During the ultrasonic nonlinearity measuring step of an object to be inspected, the fundamental frequency component of the object to be inspected is measured through a difference between the fundamental frequency component measured by the receiving unit and the fundamental frequency component measured by the transmitting unit and the harmonic component of the object to be inspected is measured through a difference between the harmonic component measured by the receiving unit and the harmonic component measured by the transmitting unit.

Here, the fundamental frequency component and the harmonic component of the object to be inspected are displacement amplitudes of a fundamental frequency component and a second order harmonic component, respectively and an absolute nonlinear parameter of the object to be inspected is represented by the following Equation 18.

$$\beta = \frac{8A_2}{A_1^2 k^2 x} \quad \text{[Equation 18]}$$

Here, $A_1$ is a displacement amplitude of a fundamental frequency component, $A_2$ is a displacement amplitude of a second order harmonic component, k is a wave number, and x is a propagation distance.

FIG. 8 is a flowchart illustrating for explaining an ultrasonic nonlinearity measuring method according to another exemplary embodiment of the present invention in detail.

Referring to FIG. 8, an ultrasonic nonlinearity measuring method according to another exemplary embodiment of the present invention includes a calibration step of transmitting and receiving an ultrasonic signal to and from an object to be inspected having a transmission probe attached thereto, by a transmitting unit, a harmonic wave measuring step of transmitting a tone burst signal to an object to be inspected having a transmission probe attached thereto and receiving the transmitted tone burst signal, by the transmitting unit, a harmonic wave measuring step of transmitting a tone burst signal to an object to be inspected having a transmission/reception probe attached thereto and receiving the tone burst signal which passes through the object to be inspected, by a receiving unit, a calibration step of transmitting and receiving an ultrasonic wave signal to and from an object to be inspected having a reception probe attached thereto, by the receiving unit, and a step of measuring an ultrasonic nonlinearity of the object to be inspected by comparing the fundamental frequency and the harmonic component measured by the receiving unit and the fundamental frequency and the harmonic component measured by the transmitting unit.

Only the order of the steps in the flowchart illustrated in FIG. 8 is different from that of the flowchart illustrated in FIG. 5, but the contents are the same as the flowchart of FIG. 5.

Since the order of the steps is different, the harmonic wave measuring step of the receiving unit may include a step of additionally attaching a reception probe to the object to be inspected having the transmission probe attached thereto and the calibration step of the receiving unit may include a step of removing the transmission probe from the object to be inspected having the transmission/reception probe attached thereto.

Hereinafter, exemplary embodiments of the present disclosure will be described in detail with reference to the accompanying drawings.

FIGS. 9A and 9B are views illustrating for explaining a method for measuring an ultrasonic nonlinearity generated by the high voltage pulser according to an exemplary embodiment of the present invention.

Specifically, FIG. 9A is a view for explaining a harmonic wave measuring method of a transmitting unit according to an exemplary embodiment of the present invention and FIG. 9B is a view for explaining a calibration measuring method of a transmitting unit according to an exemplary embodiment of the present invention.

The calibration measuring method of a receiving unit according to an exemplary embodiment of the present invention and the harmonic wave measuring method of a receiving unit according to an exemplary embodiment of the present invention are the same as FIGS. 3A and 3B.

Referring to FIG. 3A, first, a reception probe of 10 MHz is attached to one surface of an object to be inspected corresponding to a specimen. A single crystal $LiNbO_3$ which does not have a nonlinearity is used for the reception probe.

An ultrasonic signal is transmitted and received to and from the object to be inspected having the reception probe attached thereto and the ultrasonic signal may be transmitted and received using a broadband ultrasonic pulser receiver.

Signals $V_{in}'$, $V_{out}'$, $I_{in}'$, and $I_{out}'$ are measured using a voltage probe, a current probe, and an oscilloscope to calculate $H_{out}(\omega)$.

Referring to FIG. 3B, a transmission probe of 5 MHz is attached to the other surface of the object to be inspected and a tone burst signal is generated using a high voltage pulser.

The tone burst signal $I_{out}$ may pass through the object to be inspected and measured by the current probe and the oscilloscope.

Referring to FIG. 9A, in order to measure a nonlinear parameter by the transmitting unit, the reception probe attached to the object 10 to be inspected is removed.

The reception probe is removed, the tone burst signal is transmitted to the object 10 to be inspected having the transmission probe 21 attached thereto using the high voltage pulser 120, and the transmitted tone burst signal may be measured by the current probe 40 and the oscilloscope 110.

Referring to FIG. 9B, the ultrasonic signal is transmitted and received to and from the object 10 to be inspected having the transmission probe 21 attached thereto and the ultrasonic signal may be transmitted and received using a broadband ultrasonic pulser receiver 100.

Signals $V_{in}''$, $V_{out}''$, $I_{in}''$, and $I_{out}''$ are measured using the voltage probe 30, the current probe 40, and the oscilloscope 110 to calculate $H_{in}(\omega)$.

A displacement amplitude $A_1$ of the fundamental frequency and a displacement amplitude $A_2$ of a second order harmonic wave are calculated using the current and the voltage measured as described above by the transmitting unit and the receiving unit and amplitudes of the fundamental frequency component and the harmonic component measured by the transmitting unit and the receiving unit are compared to precisely measure the nonlinear parameter of the object to be inspected.

Exemplary embodiments of the present invention include a computer readable medium which includes a program command to perform an operation implemented by various computers. The computer readable medium may include solely a program command, a local data file, and a local data structure or a combination thereof. The medium may be specifically designed or constructed for the present invention or known to those skilled in the art of a computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter.

As described above, the exemplary embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

The invention claimed is:

1. A method for measuring an ultrasonic nonlinearity generated by a high voltage pulser, the method comprising:

a calibration step of transmitting and receiving an ultrasonic signal to and from an object to be inspected having a reception probe attached thereto, by a receiving unit;

a harmonic wave measuring step of transmitting a tone burst signal generated using a high voltage pulser to an object to be inspected having a transmission/reception probe attached thereto and receiving the tone burst signal which passes through the object to be inspected, by the receiving unit;

a harmonic wave measuring step of transmitting a tone burst signal to an object to be inspected having a transmission probe attached thereto and receiving the transmitted tone burst signal, by a transmitting unit;

a calibration step of transmitting and receiving an ultrasonic signal to and from the object to be inspected having a transmission probe attached thereto, by the transmitting unit; and a step of measuring an ultrasonic nonlinearity of the object to be inspected by comparing a fundamental frequency and a harmonic component measured by the receiving unit and a fundamental frequency and a harmonic component measured, by the transmitting unit, wherein during the calibration step by the transmitting unit, a conversion coefficient represented by the following Equation 15 is measured from a voltage and a current transmitted/received by the ultrasonic signal of the transmitting unit;

$$|H_{in}(\omega)| = \sqrt{\frac{K_R(\omega)\text{Re}(Z_s)}{\omega^2 \rho v a}} \quad \text{[Equation 15]}$$

wherein $\omega$ is a frequency, $\rho$ is a density, v is an ultrasonic wave velocity, a is an area of a probe, and $Z_s$ is an impedance of a pulser.

2. The method for measuring an ultrasonic nonlinearity generated by a high voltage pulser of claim 1, wherein the ultrasonic signal is transmitted and received using a broadband ultrasonic pulser receiver.

3. The method for measuring an ultrasonic nonlinearity generated by a high voltage pulser of claim 1, wherein the harmonic wave measuring step by a receiving unit includes a step of additionally attaching a transmission probe to the object to be inspected having the reception probe attached thereto.

4. The method for measuring an ultrasonic nonlinearity generated by a high voltage pulser of claim 1, wherein the harmonic wave measuring step by a transmitting unit includes a step of removing a reception probe from the object to be inspected having the transmission/reception probe attached thereto.

5. The method for measuring an ultrasonic nonlinearity generated by a high voltage pulser of claim 1, wherein during the calibration step by a receiving unit, a conversion coefficient represented by the following Equation 11 is measured from a voltage and a current transmitted/received by the ultrasonic signal of the receiving unit;

$$|H_{out}(\omega)| = \sqrt{\frac{\left|I'_{in}(\omega)\left(\frac{V'_{out}(\omega)}{I'_{out}(\omega)}\right) + V'_{in}(\omega)\right|}{2\omega^2 \rho v a |I'_{out}(\omega)|}} \quad \text{[Equation 11]}$$

wherein $\omega$ is a frequency, $\rho$ is a density of an object to be inspected, v is an ultrasonic wave velocity, a is an area of a probe, $I_{in}'(\omega)$ is a current signal which is incident into a material from a broadband pulser, $V_{in}'(\omega)$ is a voltage signal which is incident into the material from the broadband pulser, $I_{out}'(\omega)$ is a current signal received after the ultrasonic wave incident into the material is reflected from the bottom of the material, $V_{out}'(\omega)$ is a voltage signal received after the ultrasonic wave incident into the material is reflected from the bottom of the material.

6. The method for measuring an ultrasonic nonlinearity generated by a high voltage pulser of claim 1, wherein the fundamental frequency and the harmonic component measured by the receiving unit are calculated from the following Equation 16:

$$|A_{out}(\omega_1,\omega_2)|=|H_{out}(\omega_1,\omega_2)||I_{out}(\omega_1,\omega_2)| \quad \text{[Equation 16]}$$

wherein $\omega_1$ is a fundamental frequency, $\omega_2$ is a second order harmonic wave, $I_{out}$ is a tone burst current signal which is generated from the high voltage pulser during the harmonic wave measurement and transmits the material to be received.

7. The method for measuring an ultrasonic nonlinearity generated by a high voltage pulser of claim 6, wherein the fundamental frequency and the harmonic component measured by the transmitting unit are calculated from the following Equation 17;

$$|A_{in}(\omega_1,\omega_2)|=|H_{in}(\omega_1,\omega_2)||I_{in}(\omega_1,\omega_2)| \quad \text{[Equation 17]}$$

wherein $\omega_1$ is a fundamental frequency, $\omega_2$ is a second order harmonic wave, $I_{in}$ is a tone burst current signal which is generated from the high voltage pulser during the harmonic wave measurement and is incident into the material.

8. The method for measuring an ultrasonic nonlinearity generated by a high voltage pulser of claim 7, wherein during the ultrasonic nonlinearity measuring step of an object to be inspected, the fundamental frequency component of the object to be inspected is measured through a difference between the fundamental frequency component measured by the receiving unit and the fundamental frequency component measured by the transmitting unit and the harmonic component of the object to be inspected is measured through a difference between the harmonic component measured by the receiving unit and the harmonic component measured by the transmitting unit.

9. The method for measuring an ultrasonic nonlinearity generated by a high voltage pulser of claim 8, wherein the fundamental frequency component and the harmonic component of the object to be inspected are displacement amplitudes of a fundamental frequency component and a second order harmonic component, respectively and an absolute nonlinear parameter of the object to be inspected is represented by the following Equation 8;

$$\beta = \frac{8A_2}{A_1^2 k^2 x} \quad \text{[Equation 18]}$$

wherein $A_1$ is a displacement amplitude of a fundamental frequency component, $A_2$ is a displacement amplitude of a second order harmonic component, k is a wave number, and x is a propagation distance.

10. An ultrasonic nonlinearity measuring method, comprising:
- a calibration step of transmitting and receiving an ultrasonic signal to and from an object to be inspected having a transmission probe attached thereto, by a transmitting unit;
- a harmonic wave measuring step of transmitting a tone burst signal to an object to be inspected having a transmission probe attached thereto and receiving the transmitted tone burst signal, by the transmitting unit;
- a harmonic wave measuring step of transmitting a tone burst signal to an object to be inspected having a transmission/reception, probe attached thereto and receiving the tone burst signal which passes through the object to be inspected, by a receiving unit;
- a calibration step of transmitting and receiving an ultrasonic signal to and from an object to be inspected having a reception probe attached thereto, by the receiving unit; and
- a step of measuring an ultrasonic nonlinearity of the object to be inspected by comparing a fundamental frequency and a harmonic component measured by the receiving unit and a fundamental frequency and a harmonic component measured, by the transmitting unit;

wherein during the calibration step by the transmitting unit, a conversion coefficient represented by the following Equation 15 is measured from a voltage and a current transmitted/received by the ultrasonic signal of the transmitting unit;

$$|H_{in}(\omega)| = \sqrt{\frac{K_R(\omega) \, \text{Re}(Z_s)}{\omega^2 \rho v a}} \qquad [\text{Equation 15}]$$

wherein $\omega$ is a frequency, $\rho$ is a density, v is an ultrasonic wave velocity, a is an area of a probe, and $Z_s$ is an impedance of a pulser.

11. The ultrasonic nonlinearity measuring method of claim 10, wherein the harmonic wave measuring step by a receiving unit includes a step of additionally attaching a reception probe to the object to be inspected having the transmission probe attached thereto.

12. The ultrasonic nonlinearity measuring method of claim 10, wherein the calibration step by a receiving unit includes a step of removing a transmission probe from the object to be inspected having the transmission/reception probe attached thereto.

* * * * *